United States Patent [19]
Ignacio et al.

[11] Patent Number: 5,239,942
[45] Date of Patent: Aug. 31, 1993

[54] FREEZE INDICATOR

[75] Inventors: Ramon T. Ignacio, West Covina, Calif.; Raymond P. Larsson, Denville, N.J.

[73] Assignee: Pymah Corporation, Somerville, N.J.

[21] Appl. No.: 881,027

[22] Filed: May 11, 1992

[51] Int. Cl.⁵ ............................................. G01K 5/32
[52] U.S. Cl. ................................ 116/219; 374/159; 426/88
[58] Field of Search ............ 116/216, 217, 219, 207; 374/159, 162; 426/88

[56] References Cited

U.S. PATENT DOCUMENTS

| | | | |
|---|---|---|---|
| 2,460,215 | 1/1949 | Chase | 116/216 |
| 3,177,843 | 4/1965 | Geocaris | 116/219 |
| 3,414,415 | 12/1968 | Broad, Jr. | 116/219 |
| 3,702,077 | 11/1972 | Szabo | 116/217 |
| 4,120,818 | 10/1978 | Swindells et al. | 116/219 |
| 4,145,918 | 3/1979 | Couch et al. | 116/217 |
| 4,191,125 | 3/1980 | Johnson | 116/219 |
| 4,469,452 | 9/1984 | Sharpless et al. | 116/217 |
| 5,111,768 | 5/1992 | Larsson et al. | 116/219 |

FOREIGN PATENT DOCUMENTS

| | | | |
|---|---|---|---|
| 2736470 | 2/1978 | Fed. Rep. of Germany | 116/216 |
| 2625556 | 7/1989 | France | 116/216 |
| 2119511 | 11/1983 | United Kingdom | 116/216 |
| 2130720 | 6/1984 | United Kingdom | 116/219 |

*Primary Examiner*—Thomas B. Will

[57] ABSTRACT

A freeze indicator comprising a frangible ampule containing a liquid which expands upon freezing, a dye soluble in the liquid and a nucleating agent, the nucleating agent and the liquid having substantially similar space groupings, the ampule being enclosed within a blister of transparent film, the blister being adhered to a backing, the inner surface of the blister being coating with an absorbent layer comprising a binder wettable by the liquid and a filler, whereby upon rupture of the ampule the liquid containing dye is absorbed by the absorbent layer thereby causing a color change in the absorbent layer visible through the transparent film.

59 Claims, 3 Drawing Sheets

FREEZE INDICATOR

BACKGROUND OF THE INVENTION

This invention relates to freeze indicators. More particularly, it relates to freeze indicators which may be adjusted to provide precise information to the user that a product has been exposed to a certain low temperature, usually near the freezing point of water.

Freeze indicators which utilize the expansion characteristic of water to break a frangible ampule are well known in the art; see for example, Smith U.S. Pat No. 3,545,400. Once the device shown in the Smith '400 patent is exposed to temperatures below the freezing point of water, the water freezes into ice and expands causing the ampule to break. After the ice has formed and after the surrounding temperature has returned to a point above the melt point of the ice, the water is absorbed on a dye loaded pad, thus giving an indication that the device has gone through a freeze stage and back through a thaw stage.

Problems have arisen in giving an accurate indication of the passage of the device through the normal freezing point of water, i.e. 0° C., due to the undercooling effect of water which will permit water to remain in its liquid state substantially below its normal freezing point as for example, as low as −16° C. This problem has been partially overcome by the addition of certain nucleating agents to the water. An example of this is shown in British Patent No. 1,245,135, issued to Scheller. Scheller discloses the technique of adding powdered glass to an ammonium chloride solution to avoid undercooling.

U S. Pat. Nos. 3,956,153 and 3,980,581, issued respectively to Chadha and Godsey, disclose the use of nucleating agents having space groups substantially similar to space groups of thermally responsive materials used in disposable thermometers. Chadha '153, discloses the use of anthraquinone as a regenerative nucleating agent.

It is known that over a period of time a nucleating agent will become "poisoned". Not wishing to be bound by theory this poisoning effect is believed to result either from contamination by the medium into which it is incorporated or by some as yet unexplained change with time in the crystal structure of the surface of the nucleating agent. The solution to this "poisoning" problem which Chadha proposed was to incorporate into the thermally responsive material a nucleating agent which is slightly soluble in the thermally responsive material at a concentration in excess of the solubility. The result is that with each remelt and nucleation cycle a fresh surface of nucleating agent is presented which effectively nucleates the thermally responsive medium. Of course where the preferred nucleating agent for a system is insoluble, the approach of Chada cannot be utilized.

An improved freeze indicator has been disclosed in U S. Patent No. 4,191,125 to Johnson. That '125 patent discloses a device comprising a water filled frangible ampule, a nucleating agent and a surfactant. Suitable nucleating agents which are disclosed include cupric sulfide, ferrous sulfide, zinc metal, molybdenum sulfide, tungsten sulfide, beryllium aluminum silicate and silver iodide, all of which are substantially insoluble in water. These insoluble nucleating agents are susceptible to the poisoning effect discussed above.

More recently, an improved indicator of the type described by Johnson has been patented. See co pending U.S. application Ser. No. 07/72,335 to Larsson, now U.S. Pat. No. 5,111,768. The improvement of Larsson comprises utilizing an insoluble metal compound as the nucleating agent together with a soluble salt of the metal in the metal compound. Additionally, Larsson discloses utilizing an absorbent material to obscure the ampule from view. While this aspect of the Larsson freeze indicator is preferred by some customers for the device, placing the absorbent material into the packaging containing the ampule is labor intensive. What is required is a simplified method of obscuring the ampule from view in a manner which does not require separate handling of the package to put the absorbent material in place.

DETAILED DESCRIPTION OF THE INVENTION

This invention relates to an improved freeze indicator of the type shown in Johnson, U.S. Pat. No. 4,191,125. A freeze indicator which is an improvement over the Johnson '125 patent is disclosed in U.S. Pat. No. 5,111,768, to Larsson. that patent which discloses a method of inhibiting the poisoning of a nucleating agent used in a water based freeze indicator, and the composition of the nucleating agent and poison inhibitor. The term "poison inhibitor" as used in the specification and claims is used as a matter of convenience and is not intended to describe a mechanism by which the useful life of a nucleating agent is extended. In the practice of the invention disclosed in U.S. Pat. No. 4,191,125 to Johnson, it was found that while any nucleating agent within the scope of the invention would be effective immediately after the preparation of the ampules, with time, its effectiveness deteriorated as shown by breakage tests.

To test the effectiveness of a particular nucleating agent a batch of several hundred ampules designed to have a particular freezing point would be prepared, and divided into lots of fifty. A new lot would be frozen each day by holding at the particular temperature for which it was designed to break for about one hour. The number of ampules broken would be recorded. The tests would be repeated for a& least seven days. An effective nucleating agent should result in the breakage of fifty out of ampules fifty in each test.

To aid in the understanding of the instant invention the disclosure of Johnson, U.S. Pat. No. 4,191,125 will be repeated herein in detail. So much of the disclosure of the Larsson U.S. Pat. No. 5,111,768, as is necessary for a full understanding of the invention will be repeated herein. The invention may be more fully appreciated by reference to the drawings.

Figure 1:
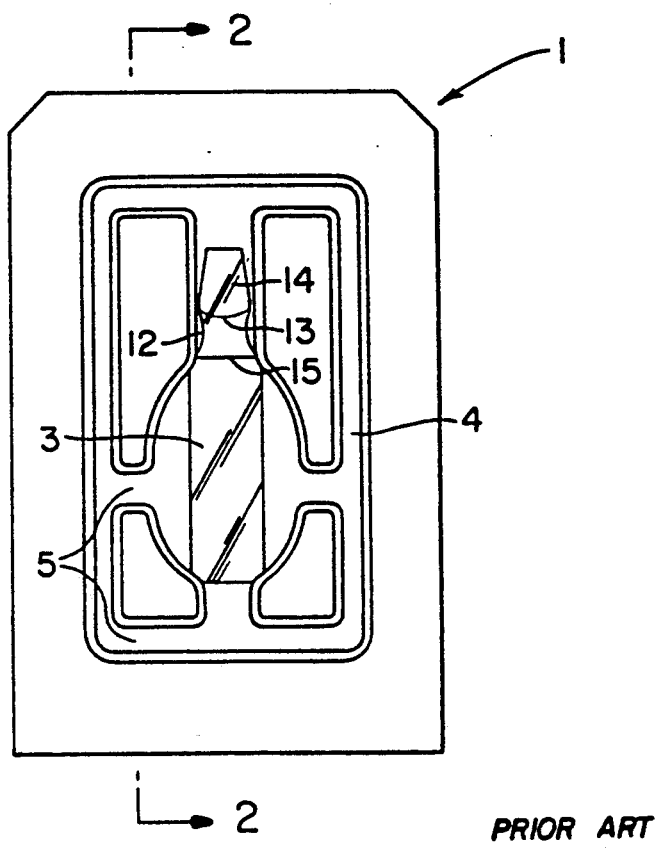
FIG. 1 is a top plan view of the indicator incorporating some of the features of the invention. (PRIOR ART)

Referring now more particularly to FIG. 1 there is provided freeze indicator 1 which includes frangible housing 3 which may be made of glass, polystyrene or any frangible material, inert to the liquid, which can be filed with liquid and sealed.

Figure 2:
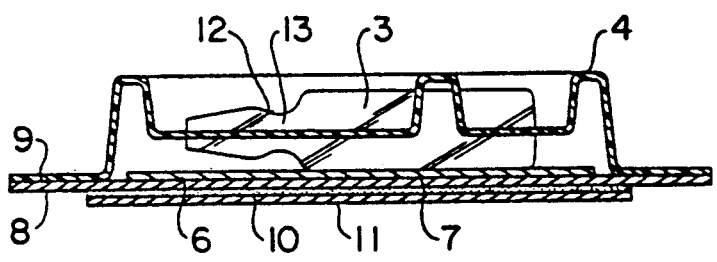
FIG. 2 is a cross-sectional side elevation of the device shown in FIG. 1 taken along line 2—2. (PRIOR ART)

Referring now to FIG. 2, frangible container 3 houses a liquid, such as water, which undergoes expansion upon freezing, thereby fracturing the frangible container when the environment around the indicator passes below the freezing point of water. In order to avoid the undercooling effects which depress the freezing point of water significantly, a nucleating agent is added to the water. The nucleating agent most preferred is one which has substantially the same molecular space grouping as the frozen water. This provides for faster and more complete crystal growth when the environment passes below the freezing point of water.

Examples of acceptable nucleating agents are cupric sulfide and beryllium aluminum silicate. Other acceptable materials are ferrous sulfide, zinc metal, molybdenum sulfide, and tungsten sulfide. Also, silver iodide has been shown to provide adequate results.

In order to increase the surface area of contact between nucleating agents and the water, a surfactant or wetting agent has also been added to the mixture. Suitable surfactants include Atlas ® G-2127, Tween ® 80, Ultrawet 601 and Triton ® X-100, all of which are commercially available. Tween ® 80, represented by the chemical expression polyoxyethylene 20 sorbitan monooleate, is believed to be sorbitan monooleate ethoxylate with 20 moles of ethylene oxide. Triton ® X-100 is a para-isooctyl polyethyleneglycol phenyl ether containing an average of ten ETO moieties per molecule. While Johnson '125 discloses the use of a surfactant it has been found that the use of the surfactant is optional.

In order to fine-tune the device so that an indication is given for a predetermined temperature, an amount of deuterium oxide may be added to the water. Deuterium oxide ($D_2O$) has a normal freeze point around 4° C. By adding the proper amount of $D_2O$ to $H_2O$, the freeze point of the mixture may be raised accordingly to accommodate particular needs. Even by using the above mentioned nucleating agents, it has been found that the device, without $D_2O$ added, freezes at about −4° C. By formulating a mixture of 98% $D_2O$ and 2% $H_2O$, the freeze point is raised to approximately 0° C. Various freeze points between 4° C. and 0° C. may be provided by adding lesser and lesser amounts of $D_2O$ below 98%. Since frozen deuterium oxide has the same molecular space groupings as frozen water, the same nucleating agents as mentioned above may also be used to overcome the undercooling affect.

As can be seen in FIG. 2, the frangible ampule is protected from damage before freezing by a semi-rigid plastic blister 4. This blister 4 has various ridges 5 which provide mechanical strength to the device so that the ampule will not break if handled roughly. The blister can be vacuum formed of polyvinyl chloride. or any other suitable deformable plastic material which is inert to the liquid system of the indicator. Immediately below the frangible ampule is indicator pad 6 which is a layer of absorbent material such as Whatman 1 MM paper, available from Whatman Company. A water soluble dye 7 is printed on the backside of indicator pad 6. When the ampule 3 is broken, an amount of unfrozen water is released from the ampule and poured onto pad 6, and is absorbed down to dye layer 7. The water will dissolve the dye, causing the dye to migrate to the top of the pad nearest the ampule. Since blister 4 is an optically clear material, a visible indication of freeze is then provided.

In most prior art freeze indicators, a thaw must occur in order to determine that the environment had ever undergone freezing because upon freezing, the liquid, such as water, becomes solid and cannot possibly wet an indicator means.

It is uncertain as to why in Johnson's device, this wetting occurs immediately upon freezing and breakage of the ampule However, it is possible that there is only sufficient solidification of a portion of the water to break the ampule, with enough liquid remaining present to give an immediate color change on the indicator paper. Also, as the water freezes and expands into ice, the pressure in the remaining part of the ampule increases, causing a depression of the freezing point of the remaining water. When the ampule breaks, there is a sudden decrease in pressure inside the ampule, causing the water to be quickly propelled onto the indicator pad before it can freeze. Also, the surfactant assists in the removal of the water from the cracked ampule by lowering the surface tension between the water and the fractured ampule, thus providing a dual function for the surfactant, the other function being to increase the surface area of contact between the liquid and the nucleating agent.

Referring again to FIG. 2, the blister cover 4 is sealed to backing 8 around edges 9 of the device by heat sealing. An adhesive 10 is provided on the bottom of backing 8 so that the freeze indicator may be readily attached to packages which need such an indicator. A releasable paper cover 11, which is peelable from the adhesive, is applied over the adhesive 10 to protect the adhesive prior to use.

As can be seen from FIGS. 1 and 2, the ampule 3, which in the embodiment is glass, includes constricted neck 12. The constricted neck is at liquid fill height of the ampule when the ampule is upright. Air space is therefore provided above the constricted neck in region 13. The ampule is sealed with either an epoxy adhesive or a glass melt seal as indicated at 14. The air space 13, provides for volumetric expansion of the liquid due to heating, such expansion being smaller than the volumetric expansion due to freezing. In this embodiment, approximately two percent (2%) air space is provided. The fill level of the ampule is indicated by line 15 shown in FIG. 1. The air space which is provided in region 13 should be within the limits of one to six percent (1%–6%) of the total volume of the ampule.

Figure 3:
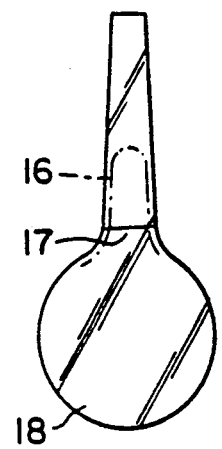
FIG. 3 is an alternative ampule which may be used in the indicator shown in FIG. 1. (PRIOR ART)

Another embodiment of the ampule is shown in FIG. 3 in which a bulb-type container with capillary extension 16 is provided. The bulb is filled to a level 17 with the mixture of water, surfactant, and nucleating agent. A part of the nucleating agent, which in this embodiment can be cupric sulfide, is indicated at 18. The volume of the air space in the capillary portion of the ampule 16 is again within the range listed above. Thus the air space is small enough to permit breakage of the ampule due to the expansion of the freezing liquid, but large enough to allow thermal expansion of the liquid without breaking the ampule.

Surprisingly, the addition of cupric sulfate to the water system of the indicator was found to resolve the nucleation problem and resulted in successful vial breakage at test conditions. It has been found that at least 0.075 wt. % cupric sulfate, based on the cupric sulfide, when added to the water system of the indicator results in protection of the cupric sulfide nucleating agent from poisoning. Preferably, at least 0.09% cupric sulfate can be used; more preferably, at least 0.10% cupric sulfate is used. Use of larger amounts of cupric sulfate, e.g., 0.2%, while effective to insure proper nucleation after aging, begins to have an effect on the freezing point of the indicator solution, and must be taken into account when designing the freezing point of the device. The specification for cupric sulfide is 99+% pure CuS.

Not wishing to be bound by theory, it is believed that the mechanism which operates to protect the CuS from poisoning is the continual transfer of copper ions in and out of solution maintaining a dynamic equilibrium between the insoluble cupric sulfide and the soluble cupric sulfate. The result is a continual replenishing of the surface of the cupric sulfide with fresh copper ions.

EXAMPLE I

A freeze solution having a freezing point at 0° C. was prepared having the following formulation:

TABLE I

| Component | Quantity |
| --- | --- |
| Deuterium Oxide | 1 liter |
| Synotol 119 | 2.6 grams |
| methylene blue dye | 0.38 grams |
| Cupric sulfide | 250 grams |

An alkylolamide surfactant manufactured by PVO International, Inc.

Freeze indicators were prepared by placing the ampules in a well stirred tank containing the freeze solution, drawing a vacuum on the system to remove air from the ampules and releasing the vacuum, thereby filling the ampules. The filled ampules were then sealed. The ampules had a volume of 1 cc. The ampules were designed to break at 0° C. and were tested at −3° C. An amount of cupric sulfate was added to the composition as shown in Table I.

The amount of cupric sulfate added to test ampules in groups of fifty vials each, was varied over a range of 0.0 to 0.2% by wt. based on the CuS. The results are shown in Table II.

TABLE II

| | BREAKAGE TEST −3° C. | | | |
| --- | --- | --- | --- | --- |
| Cupric Sulfate (wt. %) | One Day | One Week | Two Weeks | Two Months |
| 0% | 50/50 | 41/50 | 5/50 | 1/50 |
| 0.05 | 48/50 | 38/50 | 10/50 | 3/50 |
| 0.1 | 50/50 | 50/50 | 48/50 | 50/50 |
| 0.2 | 15/50 | — | — | — |

Based on the weight of cupric sulfide

The ampules containing 0.2% cupric sulfate did not pass the break test because this concentration of cupric sulfate depressed the melting point below 0° C.

The experiments of Example I were repeated for ampules designed to break at −4° C. The following formulation was used in preparing the ampules:

TABLE III

| Component | Quantity |
| --- | --- |
| Distilled water | 1 liter |
| Synotol 119 | 12.6 grams |
| Safranin O dye | 1.88 grams |
| Cupric sulfide | 250 grams |

The test temperature was −7° C. the results are shown in Table IV.

TABLE IV

| | BREAKAGE TEST −7° C. | | | |
| --- | --- | --- | --- | --- |
| Cupric Sulfate (wt. %) | One Day | One Week | Two Weeks | Two Months |
| 0% | 50/50 | 46/50 | 12/50 | 2/50 |
| 0.05 | 50/50 | 49/50 | 21/50 | 5/50 |
| 0.1 | 50/50 | 49/50 | 50/50 | 50/50 |
| 0.2 | 10/50 | — | — | — |

Based on the weight of Cupric Sulfate

Not wishing to be bound by theory it is believed that at the 0.2% level of copper sulfate the freezing point of the solution has been depressed sufficiently to prevent breakage at the test temperature. While the ampules are not satisfactory for a −4° C. monitoring device they will work at a lower temperature. If desired excess cupric sulfate can be used to control the freezing point of the ampule. However, for the purpose of this invention at least 0.075 wt.% cupric sulfate must be utilized, preferably at least 0.09%, most preferably at least 0.1 wt. % based on the cupric sulfide.

The concept of the invention of Larsson U.S. Pat. No. 5,111,768, may be described generically as a nucleating agent system comprising a substantially insoluble nucleating agent in combination with a poison inhibitor. The nucleating agent system is defined by selecting a nucleating agent which is a metal compound insoluble in a liquid which expands upon freezing, the metal compound and liquid having substantially similar molecular space groupings, a metal salt, soluble in the liquid as the poison inhibitor, the metal salt being a salt of the same metal as the metal compound, thereby providing a source of soluble metal ion of the same metal as the cation of the inhibitor. The poison inhibitor must have a solubility in excess of the concentration at which it will be used, e.g., at least 0.15 grams per 100 ml of water at room temperature. Preferably, the solubility of the poison inhibitor is at least 0.3 grams per 100 ml; more preferably the solubility is at least 1 gram per 100 ml; most preferably at least 10 grams per 100 ml.

It is well known that cuprous iodide acts as a nucleating agent for water in ice formation. The phenomenon is used in artificial rain making and in producing "snow" for ski slopes where natural precipitation has not occurred. Based on this knowledge freeze indicators were prepared using cuprous iodide as the nucleating agent. Tests on freshly prepared indicators resulted in 100% breakage after 10 minutes at the test temperature. After one day of aging, however, only 60% of the test specimens broke after one hour, suggesting a poisoning effect was at work. The addition of 0.1% of cupric sulfate, based on the iodide, to the indicator system resulted in improved nucleation. Illustrative, non-limiting examples of poison inhibitors are shown in Table V. As used in the specification and claims, the term metal compound includes zinc metal.

TABLE V

| Nucleating Agent | Poison Inhibitor |
| --- | --- |
| Cupric Sulfide | Cupric sulfate |
| ferrous sulfide | ferrous sulfate |
| molybdenum sulfide | molybdenum tetrabromide |
| silver iodide | silver fluoride |
| zinc metal | zinc chloride |
| cupric iodide | cupric sulfate, |
| — | cuprous chloride |

Generally, the level of poison inhibitor, based on the nucleating agent, is the same as that disclosed for the cupric sulfide/cupric sulfate system. Expressed in weight percent based of the weight of nucleating agent the amount of poison inhibitor used is at least 0.075%, more preferably at least 0.09%, most preferably at least 0.1 %. The poison inhibitor must have a solubility in excess of the concentration at which it will be used, e.g., at least 0.15 grams per 100 ml of water at room temperature. Preferably, the solubility of the poison inhibitor is at least 0.3 grams per 100 ml; more preferably the solubility is at least 1 gram per 100 ml; most preferably at least 10 grams per 100 ml.

Those skilled in the art having access to this disclosure will appreciate that by selecting a metal compound which has finite solubility in the order of about 0.15 wt.% to about 1.0 wt. % based on the weight of the liquid, the inhibitor and poison inhibitor will be the identical compound. Preferably, the solubility of the compound will be about 0.15 to about 0.5 wt. %, more preferably about 0.15 to 0.3 wt. %, e.g., 0.25 wt. %. The upper limit of solubility is based on the practicality of controlling the freezing point of the solution. Large solubility levels will make it impossible to have both insoluble inhibitor present and a minor amount of soluble ion, while still being able to control the freezing point of the solution.

In a preferred embodiment of the invention the nucleating agent system comprises an insoluble metal compound in combination with a soluble salt of the metal wherein the valence of the metal in the metal salt is the same as the valence of the metal of metal compound. By way of illustration, where the metal compound is cupric sulfide the preferred sat is a soluble cupric salt such as cupric sulfate; where the metal compound is cuprous iodide the preferred metal salt is a soluble cuprous salt such as cuprous chloride.

Figure 4:
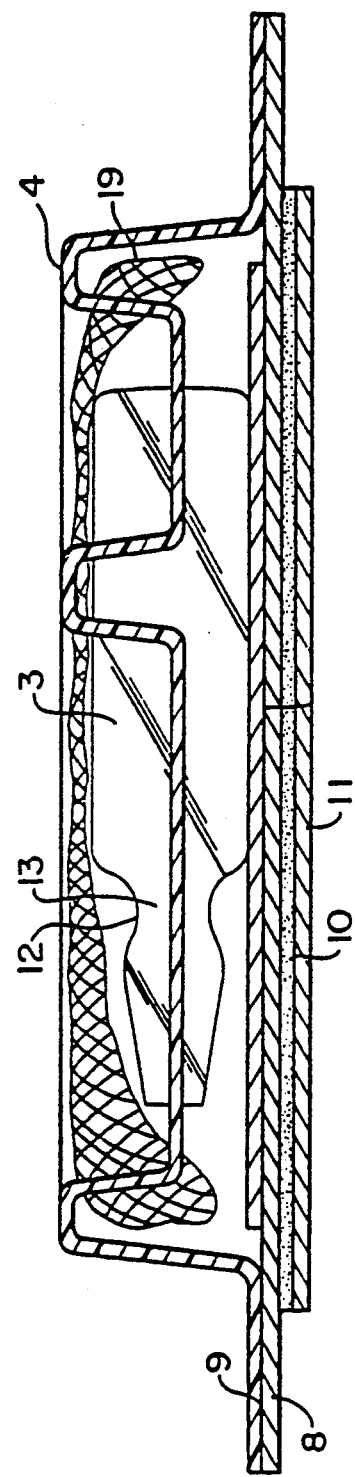
FIG. 4 is a structure showing an absorbent indicator means.

In one embodiment of the Larrson '768 as shown in FIG. 4, the indicator pad 6 of FIG. 2 is replaced by a swatch of cotton cloth 19 which obscures the ampule from view, and a dye is incorporated into the liquid. When the liquid freezes, thereby breaking the ampule, the dye containing liquid is absorbed by the cotton swatch indicating that freezing has occurred. The swatch of cotton cloth incidentally serves to protect the ampule from shock breakage. The absorbent layer is described in terms of a swatch of cotton cloth. However, any material wetted by the liquid may be used, e.g., paper or other cellulosic fibrous material and liquid wettable synthetic materials.

As was stated above the placement of the swatch of cotton cloth is labor intensive. In order to eliminate the labor involved in putting the swatch of cloth in place, an alternate method has been devised, which method forms the basis of this invention, the method comprising coating the interior of the blister packaging which encloses the ampule with an absorbent layer.

The absorbent layer can be opaque or translucent, the objective being to obscure the ampule from view for esthetic reasons. While the absorbent layer can be transparent, such a device would have little advantage over the Johnson '125 device, since the where the blister is transparent, absorbent layer 6, of Johnson '125 is visible. Of course in such a device the absorbent layer of Johnson is replaced at least in part by the absorbent layer of this invention.

Figure 5:
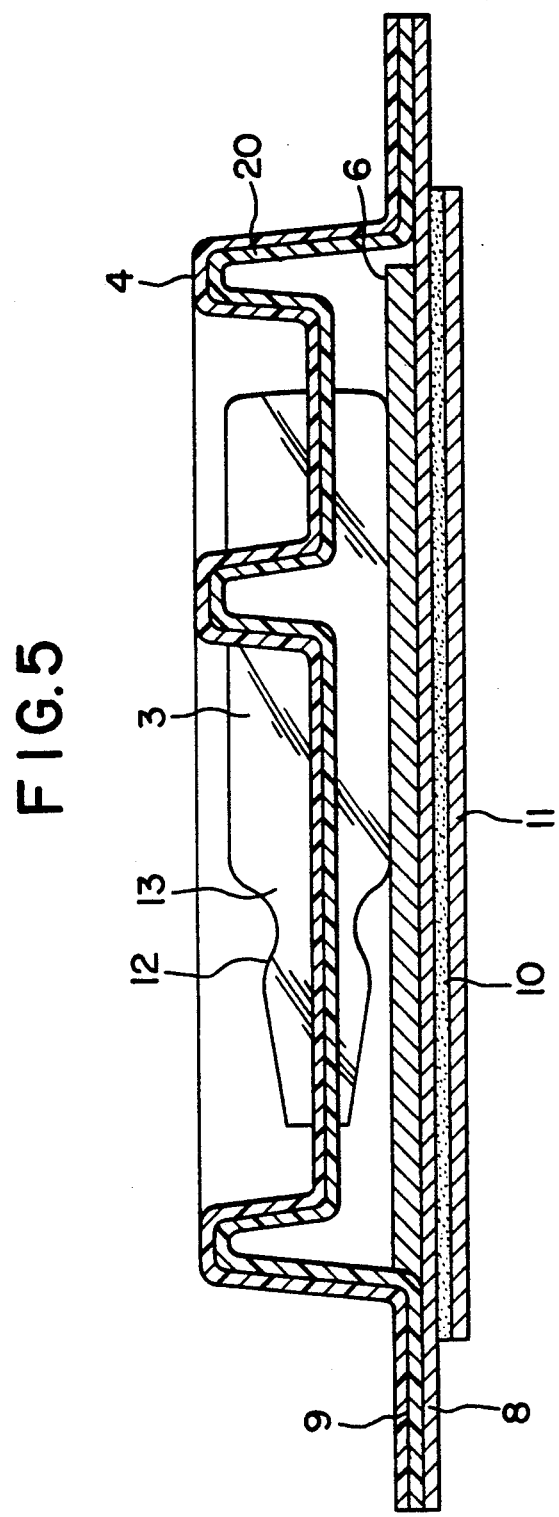
FIG. 5 is a structure showing the absorbent layer internally coated on the blister pack film.

Referring now to FIG. 5, the backing 8 can be paper stock having laminated thereto polyvinyl chloride film. The blister cover 4, which can be of polyvinyl chloride film, is generally heat sealed to the vinyl coated backing 8. In the practice of this invention the blister 4, is coated with an absorbent layer 20, which preferable can be heat sealed to the backing 8. The absorbent layer 20, is preferably opaque and comprises a binder and a filler. The filler can be any inert material whose function is to make the dye absorbed by the absorbent layer 20 more visible. Illustrative, non limiting examples of such fillers are titanium dioxide, calcium carbonate, microcrystalline cellulose and hydrated silica, e.g., HiSil ®, CABOLSIL-M ®. The binder is a water or alcohol soluble material which when dry, together with the filler, acts to absorb at least a part of the contents of the housing 3, which will leak out after rupture of the housing.

Illustrative, non-limiting examples of dyes useful in the practice of this invention are methylene blue, bromphenol blue, metacresol purple, bromthymol blue, analine blue, basic fuchsin, new fuchsin, acid fuchsin, malachite green and Safranin O. Additionally, any pH indicator salt of sodium or potassium which has a color in the basic form can be used.

Illustrative non-limiting examples of water soluble binder materials are hydroxymethyl cellulose, hydroxyethyl cellulose, hydroxypropyl cellulose and polyvinylpyrrolidone. A particularly suitable hydroxypropyl cellulose is sold by Hercules Chemical Co. under its trademark Klucell ®. These water soluble binders can be combined with water insoluble binders. Illustrative non-limiting examples of such insoluble binders are ethylhydroxyethyl cellulose, methyl cellulose, ethyl cellulose, guar gum and mixtures thereof. While guar gum is listed as a water insoluble binder it will be appreciated by those skilled in the art that it comprises about 85% soluble components and about 15% insoluble components. Therefore, for the purpose of this invention it can be used to furnish both soluble and insoluble components. It can be admixed with both water soluble binders and in conjunction with other insoluble binders. The preferred binder is a combination of polyvinylpyrroiidone and ethylhydroxyethyl cellulose ("EHEC").

The preference as to filler will depend on the desired color. For example where a red dye, e.g. Safranin O, is used titanium dioxide will result in a pink color, whereas the use of calcium carbonate as the filler results in a blood red color. A combination of $TiO_2$ and $CaCO_3$ results in an intermediate color. It is within the scope of this invention to use a combination of fillers and a combination of different binders. Where a combination of fillers are used it is preferable that the particles size of each of the fillers be substantially the same. The term "inert" as used in connection with the filler means a filer which is not chemically reactive with any of the other components of the freeze indicator.

In preparing the absorbent layer, the binder is preferably dissolved in an alcohol or ether. Illustrative, non-limiting examples of such alcohols and ethers are ethanol, amyl alcohol, butyl alcohol, isobutyl alcohol, propylene glycol methyl ether or mixtures thereof. The filler is then added, and the mixture blended to a uniform composition. The composition is then applied to the film to be used in forming the blister pack. The advantage of alcohol or ether over water as the solvent is speed in drying. Furthermore, such solvents permit the incorporation of certain water insoluble binders into the absorbent layer composition. The drying can be accomplished by simple air drying, vacuum drying or oven drying at a temperature low enough so as not to distort the film being used.

In preparing the film 4, which is used in the blister pack, the absorbent layer binder/filler composition can be roller coated onto the film, applied with a doctor knife or applied in any other suitable manner. Surprisingly, the ethyl hydroxyethyl cellulose binder can be readily heat sealed to the PVC coated backing. Additionally, the EHEC acts to adhere the binder/filler composition to the blister film. However, under certain circumstances the dye containing water of the freeze indicator will be absorbed by the absorbent layer composition 20, in a manner that it creeps out on to edges 9 causing an unsightly appearance. This problem can be avoided by either removing the absorbent layer composition from that area after forming the blisters, e.g., by sanding the edge area 9, to remove the absorbent layer, or the absorbent layer composition can be imprinted on the film material in a pattern such that upon vacuum forming the edge area 9, is free of such material.

The composition of the absorbent layer 20 can comprise about 20 to about 50 weight percent binder and about 50 to about 80 weight percent filler; preferably, about 20 to about 40 weight percent binder and about 60 to about 80 weight percent filler, more preferably about 25 to about 35 weight percent binder and about 65 to about 75 weight percent filler, e.g., 28 percent binder and 72 percent filler by weight. The composition of the binder/filler is not critical. However, if too little filler is used the composition will not be sufficiently opaque to obscure the vial containing the freeze solution from view, and the dye which is absorbed by the absorbent layer will not have a strong color. If an excessive amount of filler is used the composition will not thermally bond well to PVC, though adhesive bonding can be used. It will be appreciated by those skilled in the art having access to this disclosure that the weight ratio of binder/filler will depend in part on the bulk density of the filler. The exemplary values given above are suitable for powdery fillers of high bulk density such as $TiO_2$ and $CaCO_3$.

Typical compositions which can be used in the practice of this invention as the absorbent layer 20, are shown below. It is preferred that mixtures of binders be utilized. More preferable the binder composition comprises at least one water soluble binder and at least one water insoluble binder. For ease of preparation standard solutions of binder material were prepared. Several typical standard solutions utilizing polyvinylpyrrolidone and EHEC are shown in Table VI.

TABLE VI

| Blend # | STANDARD BINDER SOLUTIONS | |
|---|---|---|
| | Solvent | Binder |
| S-1 | Propasol-M (88%) | Polyvinylpyrrolidone (12%) |
| S-2 | Propasol-M (80%) | Ethylhydroxyethyl cellulose (20%) |
| S-3 | p-Amyl Alcohol (44%) Ethanol (44%) | Polyvinylpyrrolidone (12%) |

A propyleneglycol methyl ether manufactured by Unical Corporation

The standard binder solutions were blended with the filler by grinding in a ball mill until the composition was uniform, and applied to the film material for preparing &he blister. After drying, the blisters were formed in a multicavity mold by vacuum forming. Typical formulations for the binder/filler compositions from which the absorbent layer 20 is prepared are shown in Table VII.

TABLE VII

| Binder Solution | Wt. % | Filler | Wt. % |
|---|---|---|---|
| | | Formula A | |
| S-1 | 41.65 | Titanium Dioxide | 16.55 |
| S-2 | 16.20 | Calcium Carbonate | 4.10 |
| Propasol-M | 21.50 | | |
| | | Formula B | |
| S-2 | 18.5 | Titanium Dioxide | 24.0 |
| S-3 | 48 | | |
| Ethanol | 9.5 | | |

Where at least a part of the binder comprises EHEC, the EHEC is preferably used in an amount which is about 9 to about 12 weight percent based on EHEC plus filler, more preferably about 10 to about 12 weight percent, e.g. 11 wt.%. In order to avoid having a binder/filler composition which does not readily absorb the dye of the indicator it is preferred that the binder/filler composition comprise less than 15% by weight of EHEC based on the EHEC plus filler, more preferably less than 14 wt. %, most preferably less than 13 wt. %, e.g., less than 12 wt. %. EHEC, based of the EHEC plus filler. These composition limits apply to other water insoluble binders generally as well as to EHEC.

Typically, the absorbent layer composition can comprise about 9 to about 12 weight percent water insoluble binder, about 13 to 26 weight percent water soluble binder and about 65 to about 75 weight percent of filler.

In one embodiment of the invention the freeze indicator is used in an upright position, that is with the ampule constricted neck 12, upward, with only the upper half of the blister pack exposed. As a result the dye containing liquid has a tendency to drain to the bottom of the blister pack. The absorbent layer of this invention is not a particularly good wicking means. Consequently, the dye may not color the visible part of the device. To forestall this result, the indicator pad 6, is placed in contact with the absorbent layer 20, of this invention. The indicator pad 6, serves both to wick the dye colored liquid up to the absorbent layer 20, and to absorb excess liquid which is not taken up by the absorbent layer 20.

In another embodiment of the invention rather than using a white filler, colored fillers can be used which impart a first color to the absorbent layer. When the dye containing liquid is absorbed by the absorbent layer the combination of colors results in a second color for the absorbent layer which is different from either the first color or the dye color. By way of example yellow lead oxide can be used as the filler. Using a blue dye results in a color change of the absorbent layer from yellow to a green color.

What is claimed is:

1. In a freeze indicator comprising a frangible ampule containing a liquid which expands upon freezing, a dye soluble in the liquid and a nucleating agent, said nucleating agent and said liquid having substantially similar space groupings, said ampule being enclosed within a blister of transparent film, the blister being adhered to a backing, the improvement which comprises coating the inner surface of the blister with an absorbent layer comprising a binder wettable by said liquid and a filler, whereby upon rupture of the ampule the liquid containing dye is absorbed by the absorbent layer thereby causing a color change in said absorbent layer visible through the transparent film.

2. The freeze indicator according to claim 1 wherein the absorbent layer composition comprises about 20 to about 50 weight percent binder and about 50 to about 80 weight percent filler.

3. The freeze indicator according to claim 1 wherein the absorbent layer composition comprises about 20 to about 40 weight percent binder and about 60 to about 80 weight percent filler.

4. The freeze indicator according to claim 1 wherein the absorbent layer composition comprises about 25 to about 35 weight percent binder and about 65 to about 75 weight percent filler.

5. The freeze indicator according to claim 1 wherein the binder composition comprises a mixture of at least one water soluble binder material and at least one water insoluble binder material.

6. The freeze indicator according to claim 1 wherein the binder comprises a water soluble binder in combination with a water insoluble binder selected from the group consisting of ethylhydroxyethl cellulose, ethyl cellulose, and mixtures thereof.

7. The freeze indicator according to claim 1 wherein the binder is polyvinylpyrrolidone, hydroxypropyl cellulose, hydroxyethyl cellulose or guar gum.

8. The freeze indicator according to claim 5 wherein the water soluble binder is selected from the group consisting of hydroxymethyl cellulose, hydroxyethyl cellulose, hydroxypropyl cellulose or mixtures thereof and the water insoluble binder is selected from the group consisting of ethylhydroxyethyl cellulose, methyl cellulose, ethyl cellulose, mixtures thereof.

9. The freeze indicator according to claim 1 wherein the binder is a mixture of ethyl cellulose, and hydroxypropyl cellulose.

10. The freeze indicator according to claim 1 wherein the binder is a mixture of ethylhydroxyethyl cellulose, and hydroxypropyl cellulose.

11. The freeze indicator according to claim 1 wherein the binder is a mixture of ethylhydroxyethyl cellulose, and polyvinylpyrrolidone.

12. The freeze indicator according to claim 1 wherein the filler is titanium dioxide or calcium carbonate.

13. The freeze indicator according to claim 1 wherein the filler is titanium dioxide.

14. The freeze indicator according to claim 1 wherein the filler is calcium carbonate.

15. The freeze indicator according to claim 1 wherein the filler is a mixture of titanium dioxide and calcium carbonate.

16. The freeze indicator according to claim 1 wherein the absorbent layer is a heat sealable composition.

17. The freeze indicator according to claim 1 wherein the absorbent layer comprises about 9 to about 12 percent water insoluble binder, about 13 to about 26 weight percent water soluble binder and about 65 to about 75 weight percent filler.

18. The freeze indicator according to claim 17 wherein the filler is titanium dioxide or calcium carbonate.

19. The freeze indicator according to claim 17 wherein the filler is titanium dioxide.

20. The freeze indicator according to claim 17 wherein the filler is calcium carbonate.

21. The freeze indicator according to claim 17 wherein the filler is a mixture of titanium dioxide and calcium carbonate.

22. The freeze indicator according to claim 17 wherein the water soluble binder is selected from the group consisting of hydroxymethyl cellulose, hydroxyethyl cellulose, hydroxypropyl cellulose, polyvinylpyrrolidone and mixtures there of, and the water insoluble binder is selected from the group consisting of ethylhydroxyethyl cellulose, methyl cellulose, ethyl cellulose, and mixtures thereof.

23. The freeze indicator according to claim 17 wherein the water insoluble binder is ethylhydroxyethyl cellulose and the water soluble binder is polyvinylpyrrolidone.

24. The freeze indicator according to claim 1 wherein the liquid is deuterium oxide, water or mixtures thereof.

25. The freeze indicator according to claim 1 wherein the liquid comprises deuterium oxide having incorporated therein a minor amount of water.

26. The freeze indicator according to claim 24 wherein the liquid contains a soluble dye and the filler is a mixture of Titanium Dioxide and Calcium Carbonate.

27. The freeze indicator according to claim 26 wherein the dye is methylene blue, Safranin O, bromphenol blue, metacresol purple, bromthymol blue, analine blue, new fuchsin or malachite green.

28. The freeze indicator according to claim 25 wherein the liquid contains a soluble dye and the filler is a mixture of Titanium Dioxide and Calcium Carbonate.

29. The freeze indicator according to claim 28 wherein the dye is methylene blue, Safranin O, bromphenol blue, metacresol purple, bromthymol blue, analine blue, new fuchsin or malachite green.

30. The freeze indicator according to claim 1 wherein the absorbent layer coated transparent film is heat sealed to the backing.

31. The freeze indicator according to claim 1 wherein the nucleating agent for the liquid is a nucleating agent system comprising a metal compound insoluble in the liquid, said metal compound and said liquid having substantially similar molecular space groupings, in combination with a nucleating agent poison inhibitor comprising a salt of the same metal as the metal compound, said salt being soluble in said liquid.

32. The freeze indicator according to claim 31 wherein the metal compound is cupric sulfide, ferrous sulfide, molybdenum sulfide, beryllium aluminum silicate, tungsten sulfide, silver iodide or cuprous iodide.

33. The freeze indicator according to claim 31 wherein the metal salt is present at a concentration of about 0.075 wt. % to about 0.2 wt. % based on the weight of metal compound.

34. The freeze indicator according to claim 31 wherein the metal salt is present at a concentration of about 0.09 wt. % to about 0.1 wt. % based on the weight of metal compound.

35. The freeze indicator according to claim 31 where in the metal compound and the soluble salt comprise metals of the same valence state.

36. The freeze indicator according to claim 31, wherein the nucleating agent system comprises CuS in combination with cupric sulfate.

37. The freeze indicator according to claim 31, wherein the nucleating agent system comprises silver iodide in combination with silver fluoride.

38. The freeze indicator according to claim 31, wherein the nucleating agent system comprises CuI in combination with cuprous sulfate.

39. The freeze indicator according to claim 31, wherein the nucleating agent system comprises CuI in combination with cuprous chloride.

40. The freeze indicator according to claim 31 wherein a surfactant is included in the liquid.

41. The freeze indicator according to claim 31 wherein the liquid comprises deuterium oxide.

42. The freeze indicator according to claim 31 wherein the liquid comprises deuterium oxide and a minor amount of water.

43. The freeze indicator according to claim 31 wherein the liquid comprises water.

44. The freeze indicator according to claim 1 wherein the filler imparts a first color to the absorbent layer and the absorption of the dye by the absorbent layer results in a second color.

45. A freeze indicator comprising a frangible ampule containing a liquid comprising deuterium oxide, a dye soluble in the liquid, and a nucleating agent, said nucleating agent and said liquid having substantially similar space groupings, said ampule being enclosed within a blister of transparent film, the blister being adhered to a backing, the inner surface of the blister being coated with an absorbent layer comprising a binder wettable by said liquid and a filler, whereby upon rupture of the ampule the liquid containing dye is absorbed by the absorbent layer thereby causing a color change in said absorbent layer visible through the transparent film, wherein:
(a) the binder is a mixture of at least one water soluble binder and at least on water insoluble binder;
(b) the filler is titanium dioxide, calcium carbonate hydrated silica or mixtures thereof; and
(c) the dye is methylene blue, Safranin O, bromphenol blue, metacresol purple, bromthymol blue, analine blue, basic fuchsin or malachite green.

46. The freeze indicator according to claim 45 wherein the liquid comprises deuterium oxide and a minor amount of water.

47. The freeze indicator according to claim 45 wherein the water soluble binder is selected from the group consisting of hydroxymethyl cellulose, hydroxyethyl cellulose, hydroxypropyl cellulose, polyvinylpyrrolidone and mixtures thereof and the water insoluble binder is selected from the group consisting of ethylhydroxyethyl cellulose, methyl cellulose, ethyl cellulose, and mixtures thereof.

48. The freeze indicator according to claim 45 wherein the water insoluble binder is ethylhydroxyethyl cellulose and the water soluble binder is polyvinylpyrrolidone.

49. The freeze indicator according to claim 45 wherein the filler is titanium dioxide, calcium carbonate, hydrated silica, microcrystalline cellulose or mixtures thereof.

50. The freeze indicator according to claim 45 wherein the filler is titanium dioxide, calcium carbonate or mixtures thereof.

51. The freeze indicator according to claim 45 wherein the binder is a mixture of polyvinylpyrrolidone and ethylhydroxyethyl cellulose and the filler is a mixture of titanium dioxide and calcium carbonate.

52. The freeze indicator according to claim 45 wherein the absorbent layer composition comprises about 20 to about 50 weight percent binder and about 50 to about 80 weight percent filler.

53. The freeze indicator according to claim 45 wherein the absorbent layer composition comprises about 20 to about 40 weight percent binder and about 60 to about 80 weight percent filler.

54. The freeze indicator according to claim 45 wherein the absorbent layer composition comprises about 25 to about 35 weight percent binder and about 65 to about 75 weight percent filler.

55. The freeze indicator according to claim 45 wherein the absorbent layer comprises about 9 to about 12 percent water insoluble binder, about 13 to about 26 weight percent water soluble binder and about 65 to about 75 weight percent filler.

56. The freeze indicator according to claim 55 wherein the water insoluble binder is ethylhydroxyethyl cellulose, the water soluble binder is polyvinylpyrrolidone and the filler is a mixture of titanium dioxide and calcium carbonate.

57. The freeze indicator according to claim 51 wherein the dye is Safranin O.

58. The freeze indicator according to claim 57 wherein the dye is Safranin O.

59. The freeze indicator according to claim 45 wherein the filler imparts a first color to the absorbent layer and the absorption of the dye by the absorbent layer results in a second color.

* * * * *